Patented Dec. 1, 1953

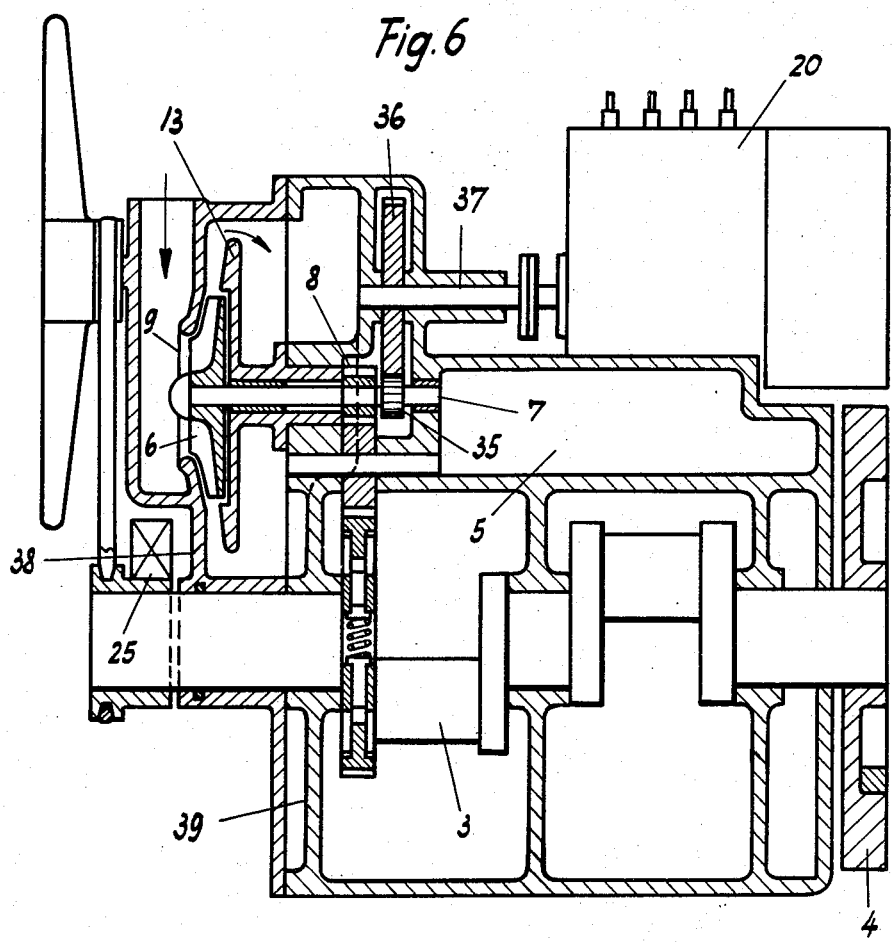
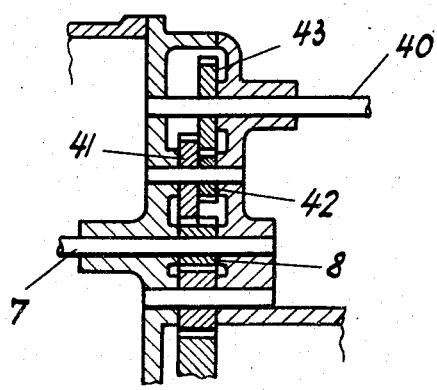

2,660,989

UNITED STATES PATENT OFFICE 2,660,989

TWO-STROKE ENGINE WITH SCAVENGING AIR BLOWER

Adolf Schnürle, Johann Kopf, Otto Elwert, and Emil Hörz, Stuttgart, Germany; said Kopf, said Elwert, and said Hörz assignors to said Schnürle; Gertrud Schnürle, sole heir of said Adolf Schnürle, deceased Application March 3, 1949, Serial No. 79,492

Claims priority, application Germany October 14, 1948

6 Claims. (Cl. 123—55)

The invention relates to V-type two-stroke cycle engines with a gear-driven turbo blower and with a scavenging air receiver located inside the engine crankcase between the two cylinder banks. Two-cycle engines require almost double the amount of air as four-cycle engines of the same output. A centrifugal or turbo blower is particularly suitable as scavenging pump for two-cycle engines as this type of blower can handle very large quantities of air at low pressure. The scavenging pressure should be kept as low as compatible with an adequate scavenging effect in order to reduce the power required for driving the blower. For the same purpose all parts of the scavenging system, i. e. the blower itself, the air receiver, the passages to the cylinders, and the cylinder ports should be designed to insure the best possible conditions for an undisturbed air flow. All passages should be kept short and of sufficiently large area, and, as far as bends are necessary to alter the direction of the air flow, they should have a large radius of curvature.

According to the invention the impeller of the blower is arranged adjacent to the front end of the scavenging air receiver. The intake opening of the blower is facing forward. The impeller shaft is supported on bearings within said scavenging air receiver.

In order to keep the overall length of the engine as short as possible the crankshaft gear of the impeller drive is located wholly or partially in the plane of the crank arm closest to the front main bearing of the engine or is made integral with said crank arm. If the distance between impeller shaft and crankshaft is relatively large, the impeller drive gear train may also contain an intermediate gear between the impeller shaft pinion and the crankshaft gear; the ratio of the diameters of the crankshaft gear and of the impeller shaft pinion being proportional to the gear reduction required in the blower drive.

It is of advantage to place the fuel injection pump on top of the scavenging air receiver between the two cylinder banks. The drive of the fuel injection pump may be taken off the crankshaft on the flywheel side of the engine or, more advantageously, off the impeller shaft; this latter arrangement of the impeller drive requires a smaller number of gears and reduces the overall length of the engine. The fuel injection pump gear may be driven, for instance, directly from the impeller shaft pinion; the pump gear then having the same diameter as the crankshaft gear in order to operate the fuel injection pump at crankshaft speed. If the fuel injection pump drive is not taken off the impeller drive pinion but off some other pinion, also mounted on the impeller shaft but farther towards the flywheel end of said shaft, the flow conditions of the scavenging air are greatly improved as outlined later in this specification.

According to another feature of the invention, the space provided as passage for the scavenging air from the diffuser into the receiver is preferably designed as a disk-like annular space having two openings to the rear portion of the receiver. Further details as regards the special design of this passage are described in a subsequent part of this specification.

In the accompanying drawings

Fig. 6 is a longitudinal section of another V engine.

Fig. 7 is a modified drive gear train for the fuel injection pump in an engine otherwise similar to that of Fig. 6.

Figure 1:
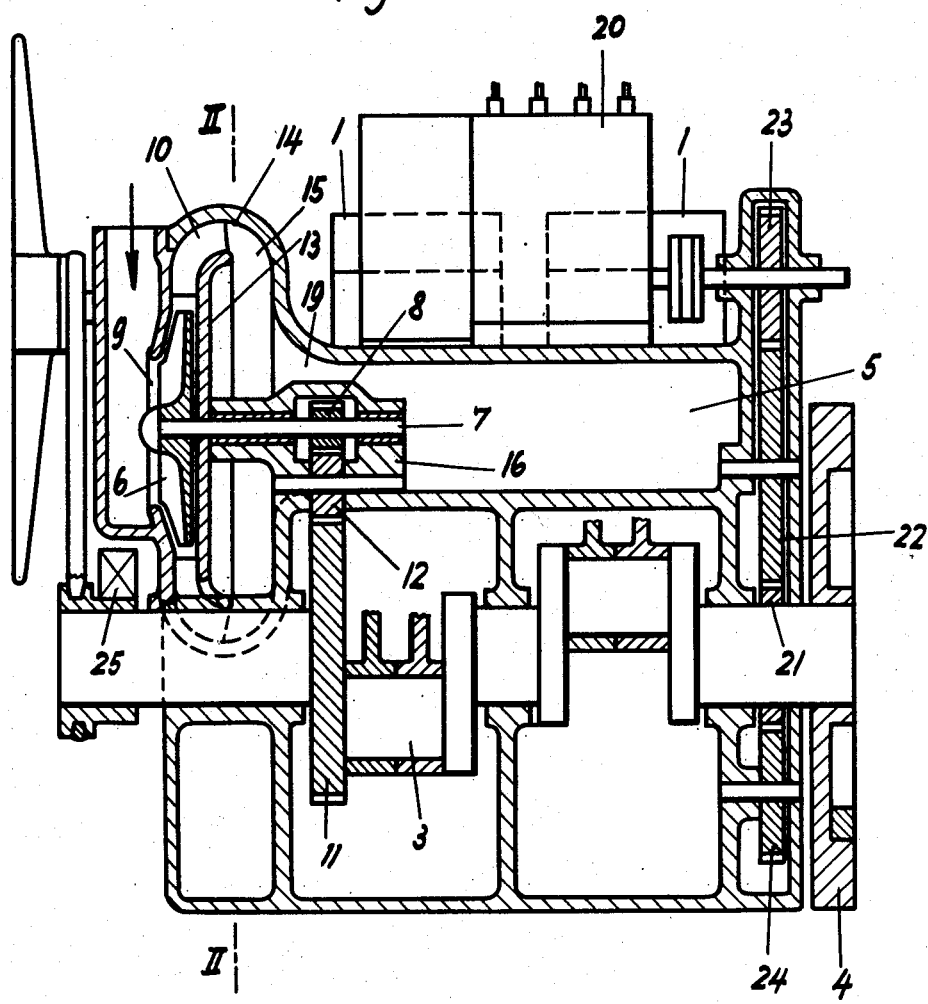
Fig. 1 is a longitudinal section through the centre plane of a V-type two-cycle engine with a centrifugal blower and a scavenging air receiver.

The illustrated engines are 4 cylinder 90° V type two-cycle engines with two engine cylinders in each bank. However, the invention is not limited to engines of the above type. The V angle may be smaller or larger than 90° and the number of cylinders may be larger than 4.

A 4-cylinder engine of the above basic design is well suited to be used as a vehicle power plant, as its over-all dimensions are relatively small. The crank throws of such an engine are 180° apart resulting in a firing order of 4 equally spaced power impulses. A 4-cylinder two stroke cycle V engine of this type with equally spaced power impulses can be compared to an 8-cylinder two-stroke-cycle in-line engine as far as speed fluctuations due to torque variations are concerned.

In a 4-cylinder two-cycle in-line engine with equally spaced power impulses the inertia forces generate relatively large force couples which cannot be fully counterbalanced by crankshaft counterweights. 2-cylinder and 3-cylinder two-cycle in-line engines also generate couples which cannot be fully balanced. The couples of a 4- cylinder two-cycle V engine, however, can be fully counterbalanced by counterweights. A 6-cylinder two-cycle V engine with unequally spaced power impulses is inherently well balanced but has relatively large torque fluctuations, whereas with equally spaced power impulses such a 6-cylinder engine will have a smooth torque but relatively large couples which cannot be fully counterbalanced by counterweights.

A 4-cylinder two-cycle 90° V engine, therefore, is particularly suited to serve as a power plant for a vehicle. Due to the relatively small speed fluctuations and the absence of unbalanced inertia forces and couples a centrifugal blower can be used as scavenging air supplier, as the operation of the blower at the required high speeds does not result in additional stresses on the blower drive gears due to unbalanced inertia forces and does not cause additional stresses on the impeller shaft bearings due to gyro action of the impeller. Furthermore, 4 cylinders operating with equally spaced power impulses are sufficient to allow the use of a centrifugal blower as scavenging air supplier, as the scavenging periods of the 4 cylinders overlap to such a degree that the scavenging port area uncovered by the engine pistons remains practically constant. The scavenging air flow, thus, is practically free of fluctuations, so that a centrifugal air blower can well be utilized as scavenging air supplier.

A 4-cylinder two-cycle 90° V engine, besides being fully balanced by counterweights for primary inertia forces and couples, is also balanced for secondary couples, so that no gyro moments can be generated in the impeller of the blower. The secondary inertia forces of a 4-cylinder engine of this type are compartively small. They act perpendicularly to the V angle center plane and occur close to the center of gravity of the engine. These secondary forces, therefore, only tend to move the crankshaft, and hence the engine, in a lateral direction, the amount of this lateral movement being approximately 0.1 to 0.2 mm. The engine with the impeller shaft will consequently not be tilted by these secondary inertia forces, so that no moments will act on the impeller shaft bearings. The importance of mounting the impeller shaft parallel to the crankshaft is, therefore, apparent.

In addition, in diesel engines the flywheel is generally of comparatively large size, so that it acts itself as a gyroscopic stabilizer.

The curve of the scavenging air pressure, plotted against engine speed, shows that the engine cylinders are supplied the same quantity of scavenging air per revolution at all engine speeds. The scavenging pressure required to obtain a constant quantity of scavenging air for each scavenging period of the cylinders increases with the square of the engine speed. The pressure of the scavenging air furnished by a centrifugal blower also increases with the square of the engine speed. This is particularly important for vehicle engines operating within a wide range of speed.

The prejudice against using centrifugal blowers in two-stroke cycle engines operating at widely varying speeds for vehicles has been based on the erroneous premises that centrifugal blowers would not supply sufficient air pressure for scavenging and charging the engine cylinders. The opinion prevailed that only constant-displacement blowers would furnish air at the pressure required at low speed operation. The invention shows this prejudice to be unfounded.

Figure 2:
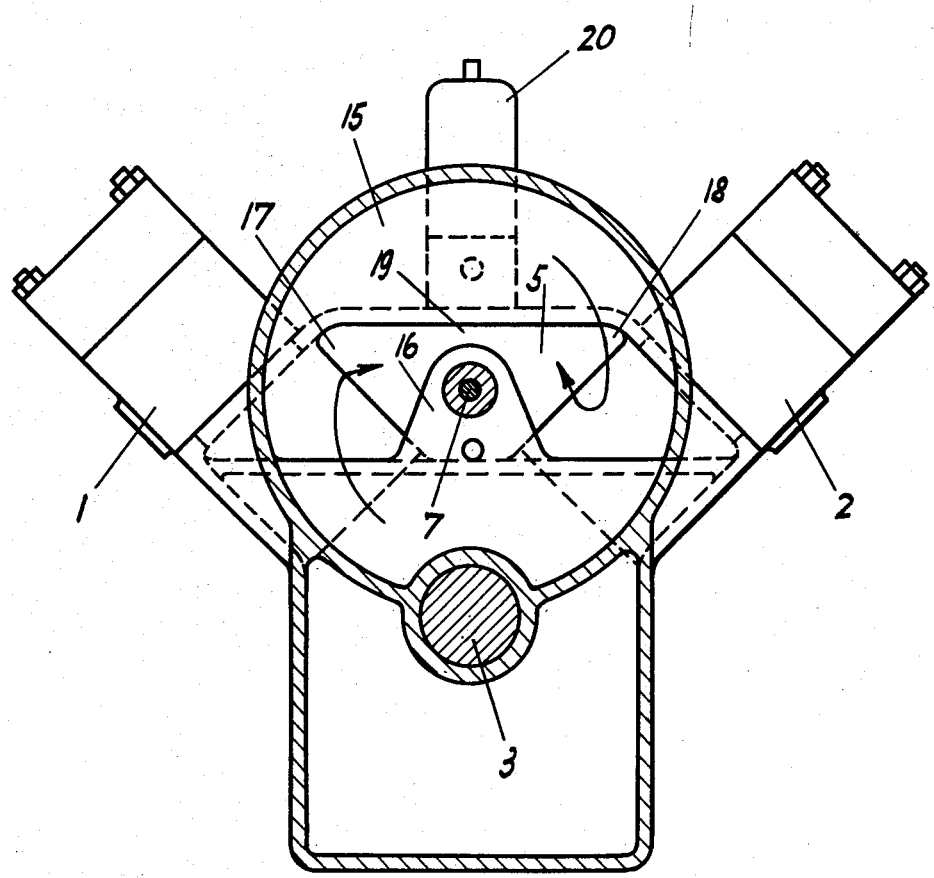
Fig. 2 is a cross-section through the diffuser shown in Fig. 1.

In the engine shown in Figs. 1 and 2, numeral 1 designates the engine cylinders of the left bank, 2 those of the right bank. The crankshaft 3 has two connecting rods mounted side by side on each crank pin. Accordingly, one of the cylinder banks is set off to the rear relative to the other bank, the distance of offset being equal to the axial width of one big-end bearing of the connecting rods. The flywheel 4 is attached to the rear end of the crankshaft 3. The scavenging air receiver 5 extends throughout the entire length of the crankcase between the bottom portions of the cylinders. The receiver 5 is supplied with scavenging air by a centrifugal blower with an impeller 6 whose impeller shaft 7 has a driven pinion 8. The impeller shaft is mounted parallel to the crankshaft 3. The intake opening 9 of the impeller is facing forward. The impeller is surrounded by a diffuser with guide vanes. Air is inducted through an intake pipe communicating with the intake opening 9 of the blower.

The impeller drive comprises a large spur gear 11 fastened to the crank arm closest to the front main bearing. This crankshaft gear may be cushioned by springs inserted in slots cut into the crank arm as well as into the said gear (see Fig. 6). An intermediate gear 12 meshes with the crankshaft gear 11 and the pinion 8. The fact that the impeller drive is taken off the front crank arm reduces the overall length of the engine.

It can be seen in Fig. 1 that the scavenging air receiver 5 immediately joins the blower 6; the receiver extending to the wall 13, is located to the rear of the impeller. The air delivered by the impeller, after passing through the diffuser, is deflected towards the receiver 5 by the outside wall 14 of the diffuser. The front portion of the receiver is here designed as a disk shaped annular chamber 15.

In order to reduce the overall length of the engine the bearing support 16 of the impeller shaft is located within the receiver 5. This arrangement of the impeller shaft, however, makes the design of the connecting passages between the annular chamber 15 and the receiver 5 difficult. According to the invention, apertures are provided on either side of the bearing support 16. In the design shown in Figs. 1 and 2 the apertures 17 and 18 (see Fig. 2) are connected by the passage 19. The direction of air flow in Fig. 2 as well as in subsequent drawings is indicated by arrows. Fig. 2 shows that the air after entering the receiver flows around the lower portions of the cylinders.

The receiver 5, which is arranged inside the crankcase between the two banks of cylinders, has lateral ducts connecting to the air passages of the cylinders. It is expedient to use the reverse-loop scavenging method with air passages located on either side of the exhaust passages.

According to Fig. 1 the fuel injection pump 20 on top of the receiver is driven from the flywheel end of the engine by the gears 21, 22 and 23. The gear 24 drives the oil pump. The free inertia forces of the reciprocating and rotating masses of the engine are balanced by a counterweight 25 attached to the front end of the crankshaft in front of the diffuser. This counterweight cannot be fastened to the crank arm closest to the front main bearing of the engine as this crank arm is a part of the blower drive. A further counterweight may be fastened, for instance, to the flywheel 4.

Figure 3:
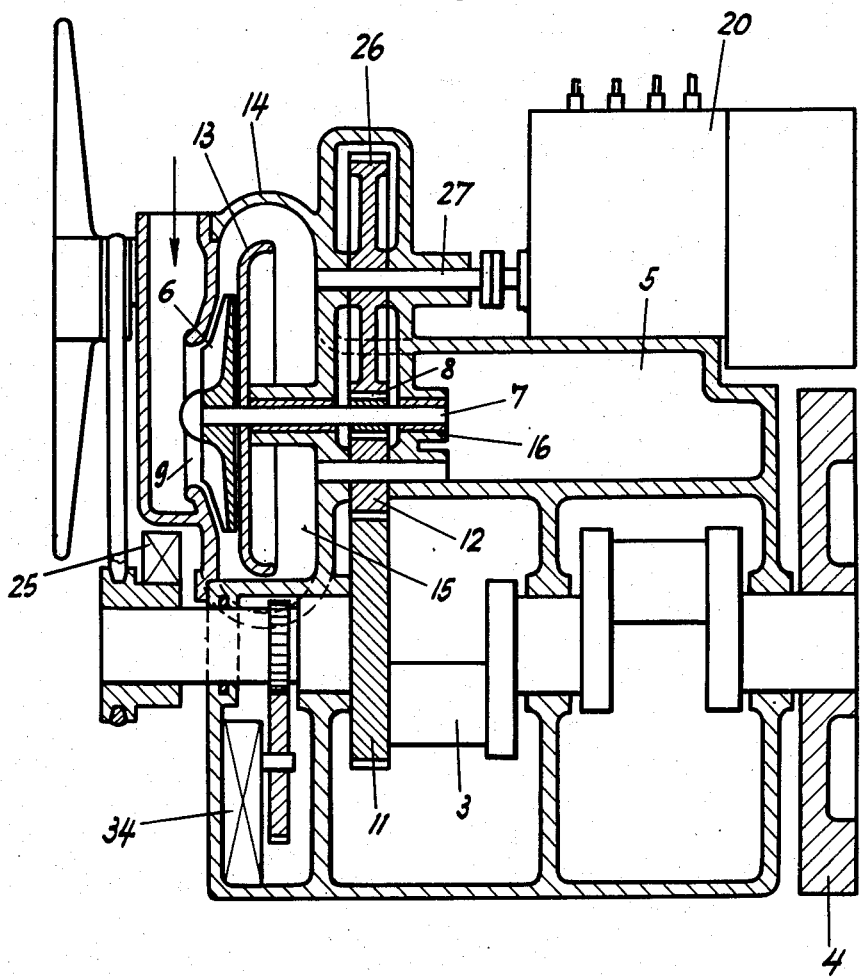
Fig. 3 is a longitudinal section of another V engine.
Figure 4:
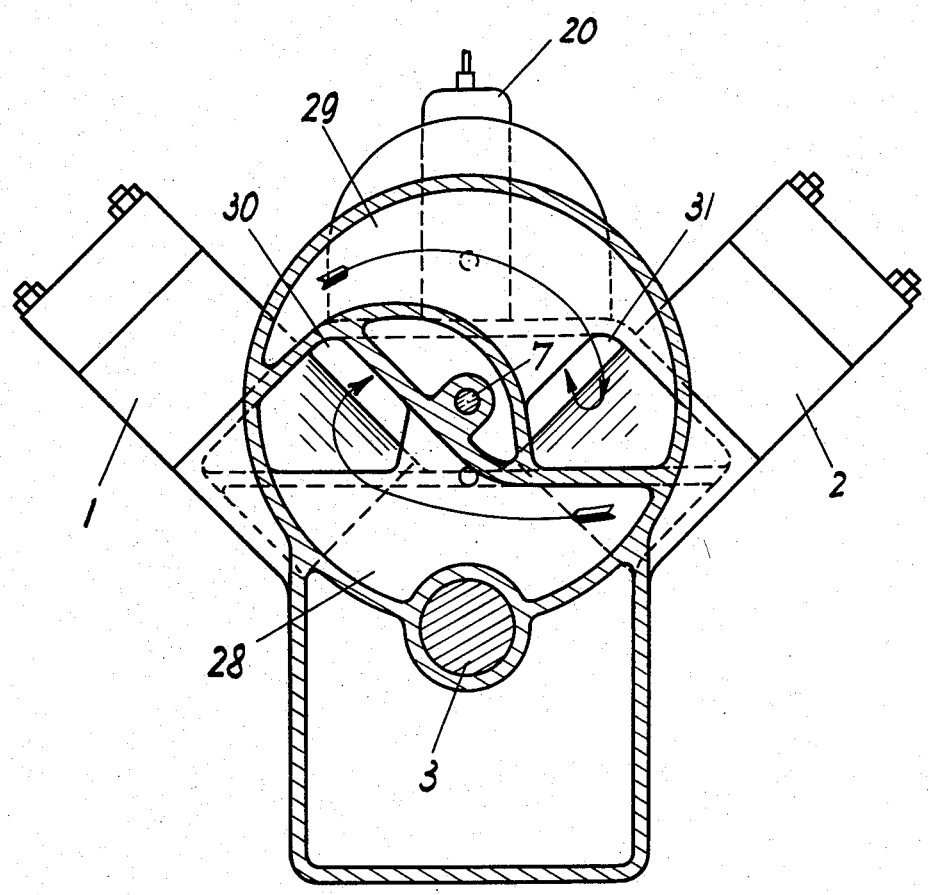
Figs. 4 and 5 are cross sections of two different types of diffusers to be used in engines of the design shown in Fig. 3.

In the design shown in Figs. 3 and 4 the previously used numerals designate the same respective parts as in Figs. 1 and 2. In order to dispense with a separate gear train for driving the fuel injection pump 20 and to reduce the overall length of the engine, the fuel injection pump is driven from the impeller shaft. As shown in Fig. 3, a gear 26 of the fuel injection pump meshes with the pinion 8. The gear train for driving the fuel injection pump thus passes through the receiver, so that the connection between the receiver and the chamber 15 has to be effected by separate apertures on either side of the impeller bearing support and of the walls covering the gears 8 and 26.

In the blower design shown in Fig. 4 the air leaving the diffuser of the blower enters into two spiral shaped chambers 28 and 29. These chambers are located between the diffuser and the receiver and their large ends are connected to the receiver by openings 30 and 31 respectively. All bends in the path of the air flow are designed with the view of keeping the deflection to the air and therefore the resistance to the air flow at a minimum.

Figure 5:
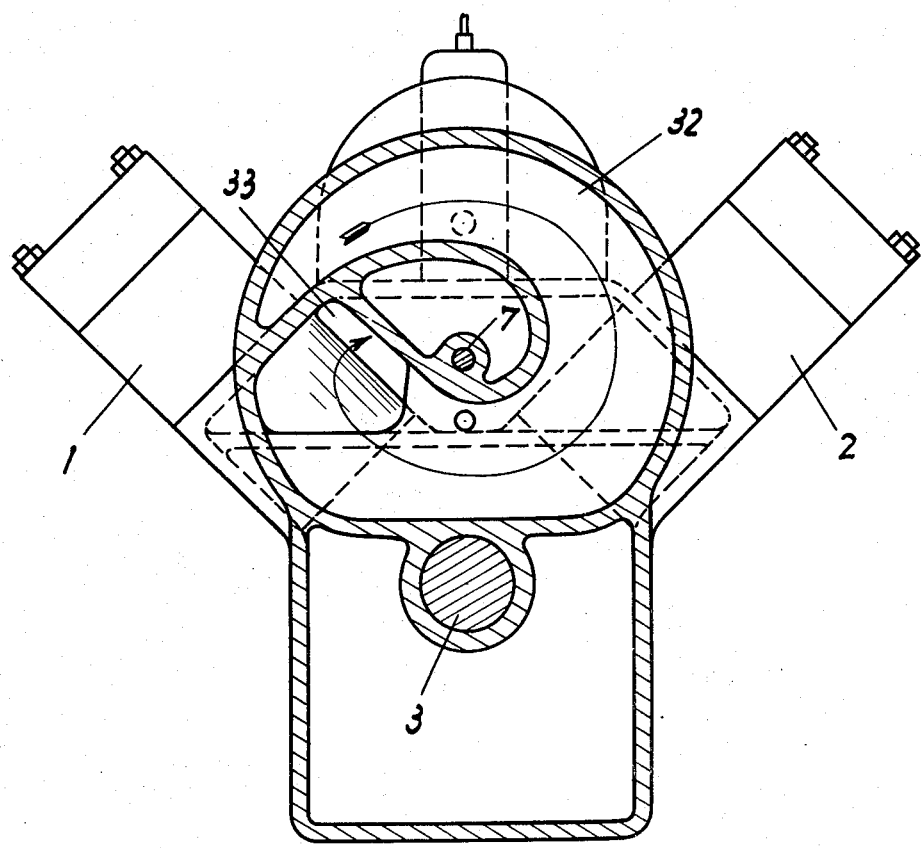

In the modified blower design shown in Fig. 5 the air enters the spiral casing 32 after leaving the diffuser. The spiral chamber extends through an angle of 360° and its large end communicates with the receiver through the opening 33.

In the engine according to Figs. 3 and 4, the pertaining oil pump 34 is driven from the front end of the engine crankshaft. Hence, no increase in overall length of the engine is required on account of the oil pump drive.

In order to obtain good conditions of flow for the air passing from the annular chamber 15 into the receiver 5, guide vanes may be provided in the chamber 15 to deflect the air to the openings between the chamber 15 and the rear portion of the receiver.

In Fig. 6 the previously used numerals are again used for like parts. The drive of the blower is taken off the crank arm closest to the front main bearing. The crankshaft gear 11 of the blower drive is of the spring cushioned type. The drive of the fuel injection pump 20 is taken off a pinion 35 on the impeller shaft 7. Pinion 35 has a smaller diameter than the impeller drive pinion 8 and meshes with a gear 36 on the shaft 37 of the fuel injection pump. Gear 36, in comparison with gear 26 in Fig. 3, is relatively small and the connecting openings between the diffuser and the receiver are accordingly larger.

In the engine shown in Fig. 6 the blower housing 38 is designed as a separate casing bolted to the crank case 39, whose front wall is plane and easy to machine straight. The front bearing of the impeller shaft 7 is supported in a separate support 13 inserted into the crankcase.

In order to accommodate large openings for the passage of the air from the blower to the receiver 5, the gear keyed to the drive shaft of the injection pump can be further reduced in diameter, if intermediate reduction gears are provided in the fuel injection pump drive between impeller and fuel pump shaft. Such a design is shown in Fig. 7. The gear train of the fuel injection pump drive consists of the gears 8, 41, 42 and 43.

We claim:
1. In a two-cycle engine having a crankcase and a crankshaft with crank arms and having two V-arranged banks of cylinders forming an angular through space between each other, in combination, a scavenging-air receiver extending along the bottom of said space and being integral with said crankcase, centrifugal scavenging-air blower means disposed adjacent to said banks at the forward end of said crankcase, said blower means comprising a housing and an impeller disposed in said housing and having a shaft parallel to said crankshaft at the height of said receiver, said housing having a rearward portion integral with said crankcase and having in said portion an annular space behind said impeller and in direct communication with said receiver, a gear transmission connecting said crankshaft with said impeller shaft and having a spur gear disposed on said crankshaft, said gear being joined with the most forward crank arm and extending in the plane of said crank arm.

2. In an engine according to claim 1, said blower housing having an intake duct portion at the forward side of said crankcase, and mass balancing weight means mounted on said crankshaft outside of said crankcase and below said intake duct portion of said housing.

3. In a two-cycle engine having a crankcase and a crankshaft and having two V-arranged banks of cylinders forming an angular space between each other, in combination, a scavenging-air receiver extending along the bottom of said angular space, a centrifugal scavenging-air blower mounted on said crankcase substantially at the height of said receiver and having a centrifugal impeller with an impeller shaft parallel to said crankshaft, a train of spur gears drivingly connecting said crankshaft with said impeller shaft and disposed in a radial crankshaft plane located on the receiver side of said impeller, said blower having an air intake conduit on its side away from said receiver and having an annular pressure space located between said impeller and said receiver, and passages connecting said pressure space with said receiver, said passages extending parallel to the crankshaft at the height of the receiver and passing through said plane on opposite sides respectively of said gear train.

4. In a two-cycle engine having a crankcase and a crankshaft and having two V-arranged banks of cylinders forming an angular space between each other, in combination, a scavenging-air receiver extending along the bottom of said angular space, a centrifugal scavenging-air blower mounted on said crankcase substantially at the height of said receiver and having a centrifugal impeller with an impeller shaft parallel to said crankshaft, a train of spur gears drivingly connecting said crankshaft with said impeller shaft and disposed in a radial crankshaft plane located on the receiver side of said impeller, said gear train having a spur gear on said crankshaft and a pinion on said impeller shaft and having an intermediate gear meshing with said spur gear and with said pinion, said intermediate gear having a smaller diameter than said spur gear, said blower having an air intake conduit on its side away from said receiver and having an annular pressure space located between said impeller and said receiver, and passage means connecting said pressure space with said receiver and traversing said plane at the height of said receiver and on both respective sides of said pinion and intermediate gear.

5. In an engine according to claim 3, said crankshaft having crank arms, said plane of said gear train being coincident with the crank arm closest to said blower, and said gear train having a spur gear joined with said latter crank arm.

6. A two-cycle engine according to claim 4, comprising a fuel pump mounted on top of said receiver in said space and having a drive shaft, and another spur gear mounted on said drive shaft in said plane and in meshing engagement with said pinion.

ADOLF SCHNÜRLE.
JOHANN KOPF.
OTTO ELWERT.
EMIL HÖRZ.

References Cited in the file of this patent

UNITED STATES PATENTS

| Number | Name | Date |
|---|---|---|
| 719,547 | Willoughby | Feb. 3, 1903 |
| 1,259,016 | Hoersting | Mar. 12, 1918 |
| 1,413,418 | Moss | Apr. 18, 1922 |
| 2,057,062 | Schneider | Oct. 13, 1936 |
| 2,245,179 | Boivie | June 10, 1941 |
| 2,265,677 | Straub | Dec. 9, 1941 |
| 2,354,227 | Szekely | July 25, 1944 |

FOREIGN PATENTS

| Number | Country | Date |
|---|---|---|
| 459,080 | France | Aug. 25, 1913 |
| 784,892 | France | May 6, 1936 |
| 875,203 | France | June 15, 1942 |
| 400,985 | Germany | Aug. 27, 1924 |
| 520,705 | Great Britain | May 1, 1940 |